(12) United States Patent
Zou

(10) Patent No.: US 12,083,460 B2
(45) Date of Patent: Sep. 10, 2024

(54) WATER FILTER

(71) Applicant: Qingdao Ecopure Filter Co., Ltd., Qingdao (CN)

(72) Inventor: Zhibin Zou, Qingdao (CN)

(73) Assignee: Qingdao Ecopure Filter Co., Ltd., Qingdao (CN)

( * ) Notice: Subject to any disclaimer, the term of this patent is extended or adjusted under 35 U.S.C. 154(b) by 0 days.

(21) Appl. No.: 18/522,639

(22) Filed: Nov. 29, 2023

(65) Prior Publication Data

US 2024/0091687 A1 Mar. 21, 2024

Related U.S. Application Data

(62) Division of application No. 17/366,014, filed on Jul. 1, 2021, now Pat. No. 11,872,510.

(51) Int. Cl.
*B01D 35/30* (2006.01)
*B01D 27/08* (2006.01)

(52) U.S. Cl.
CPC .......... *B01D 35/306* (2013.01); *B01D 27/08* (2013.01); *B01D 2201/295* (2013.01); *B01D 2201/325* (2013.01); *B01D 2201/40* (2013.01); *B01D 2221/02* (2013.01)

(58) Field of Classification Search
CPC ................. B01D 35/306; B01D 27/08; B01D 2201/295; B01D 2201/325; B01D 2201/40; B01D 2221/02; B01D 35/30; B01D 2201/302; B01D 2201/4015; C02F 1/003; C02F 2201/006; C02F 2307/12
See application file for complete search history.

(56) References Cited

U.S. PATENT DOCUMENTS

| | | |
|---|---|---|
| 3,907,688 A | 9/1975 | Close |
| 4,271,020 A | 6/1981 | Van Meter |
| 4,322,290 A | 3/1982 | Carl |

(Continued)

FOREIGN PATENT DOCUMENTS

| | | |
|---|---|---|
| CN | 1683883 A | 10/2005 |
| CN | 1683886 A | 10/2005 |

(Continued)

OTHER PUBLICATIONS https://www.lg.com/us/kitchen-accessories/lg-LT1000P-water-filter.

(Continued)

*Primary Examiner* — Waqaas Ali
(74) *Attorney, Agent, or Firm* — Calfee, Halter & Griswold LLP

(57) ABSTRACT

A water filter is provided. The water filter includes a filtration material and a filter housing spaced for accommodating at least a portion of the filtration material therein. The water filter also includes a housing cap coupled to an upper end of the filter housing for enclosing the filtration material within the water filter. The housing cap includes an upper portion, a lower portion, and a channel formed through the upper portion and the lower portion. The water filter also includes an interface adapter accommodated in the channel, wherein the interface adapter includes a side wall vertically extending from an upper surface of the interface adapter and partially around a perimeter of the upper surface, and a projection vertically extending from the upper surface, wherein the projection is integrally formed with the upper surface and a portion of the side wall.

4 Claims, 4 Drawing Sheets

(56) References Cited

U.S. PATENT DOCUMENTS

| | | | |
|---|---|---|---|
| 4,379,053 A | 4/1983 | Brane | |
| 4,645,601 A | 2/1987 | Regunathan et al. | |
| 4,735,716 A | 4/1988 | Petrucci et al. | |
| 4,877,521 A | 10/1989 | Petrucci et al. | |
| 5,102,543 A | 4/1992 | Burroughs | |
| 5,354,464 A | 10/1994 | Slovak et al. | |
| 5,645,720 A | 7/1997 | Godines | |
| 5,653,871 A | 8/1997 | Thomsen | |
| 5,705,067 A | 1/1998 | Sumi et al. | |
| 5,715,699 A | 2/1998 | Coates et al. | |
| 5,744,030 A | 4/1998 | Reid et al. | |
| 6,120,685 A | 9/2000 | Carlson et al. | |
| 6,303,031 B1 | 10/2001 | Senner | |
| 6,458,269 B1 | 10/2002 | Bassett et al. | |
| 6,949,189 B2 | 9/2005 | Bassett et al. | |
| 7,540,956 B1 | 6/2009 | Kurth et al. | |
| 7,540,957 B1 | 6/2009 | Kurth et al. | |
| 7,763,170 B2 | 7/2010 | Bassett et al. | |
| 8,246,883 B2 | 8/2012 | Bassett et al. | |
| 8,356,716 B1 | 1/2013 | Kruckenberg et al. | |
| 8,505,741 B2 | 8/2013 | Scholz et al. | |
| 8,562,830 B2 | 10/2013 | Reid | |
| 8,746,003 B2 | 6/2014 | Yoon | |
| 8,845,896 B2 | 9/2014 | Kruckenberg et al. | |
| 8,888,998 B2 | 11/2014 | Swain | |
| 9,027,361 B2 | 5/2015 | Shaffer et al. | |
| 9,067,154 B1 | 6/2015 | Branscomb et al. | |
| 9,314,722 B2 | 4/2016 | Reid | |
| 9,421,485 B2 | 8/2016 | Reid | |
| 9,931,589 B2 | 4/2018 | Tubby et al. | |
| D820,947 S | 6/2018 | An et al. | |
| D820,948 S | 6/2018 | An et al. | |
| 10,071,326 B2 | 9/2018 | Schmoll | |
| D831,786 S | 10/2018 | Zou | |
| 10,188,972 B2 | 1/2019 | You et al. | |
| 10,226,722 B1 | 3/2019 | Baird | |
| D854,122 S | 7/2019 | An et al. | |
| D856,472 S | 8/2019 | Zou | |
| D857,157 S | 8/2019 | Zou | |
| D857,158 S | 8/2019 | Zou | |
| D865,119 S | 10/2019 | An et al. | |
| 10,532,302 B2 | 1/2020 | You et al. | |
| D878,517 S | 3/2020 | Zou | |
| 10,639,570 B2 | 5/2020 | You et al. | |
| 10,653,984 B2 | 5/2020 | You et al. | |
| 10,724,786 B2 | 7/2020 | Park | |
| 10,734,498 B1 | 8/2020 | Brown et al. | |
| 10,737,206 B2 | 8/2020 | Reid | |
| 10,780,377 B2 | 9/2020 | Schmitt et al. | |
| 10,807,026 B2 | 10/2020 | Stamey, Jr. et al. | |
| D913,416 S | 3/2021 | Qiang | |
| 2003/0085572 A1 | 5/2003 | Froment et al. | |
| 2004/0144710 A1 | 7/2004 | Bassett et al. | |
| 2004/0211931 A1 | 10/2004 | Olson et al. | |
| 2005/0023206 A1 | 2/2005 | Fritze | |
| 2005/0167352 A1 | 8/2005 | Burrows et al. | |
| 2006/0213821 A1 | 9/2006 | Choi et al. | |
| 2006/0243652 A1 | 11/2006 | Tubby et al. | |
| 2006/0254971 A1 | 11/2006 | Tubby et al. | |
| 2007/0144953 A1 | 6/2007 | Rivi | |
| 2007/0227959 A1 | 10/2007 | Sinur et al. | |
| 2008/0142431 A1 | 6/2008 | Lim et al. | |
| 2009/0236271 A1 | 9/2009 | Eserkaln et al. | |
| 2009/0236277 A1 | 9/2009 | Kurth et al. | |
| 2009/0321340 A1 | 12/2009 | Rampen et al. | |
| 2010/0170841 A1 | 7/2010 | An et al. | |
| 2010/0275633 A1 | 11/2010 | An et al. | |
| 2011/0120928 A1 | 5/2011 | Schmitt | |
| 2011/0139698 A1 | 6/2011 | Freystedt et al. | |
| 2011/0168613 A1 | 7/2011 | Van Savooijen et al. | |
| 2011/0203985 A1 | 8/2011 | Reid | |
| 2012/0031821 A1 | 2/2012 | Swain | |
| 2013/0220910 A1 | 8/2013 | Gu et al. | |
| 2013/0298378 A1 | 11/2013 | Suri | |
| 2014/0061119 A1 | 3/2014 | Croissant et al. | |
| 2014/0144173 A1 | 5/2014 | Shaffer et al. | |
| 2014/0175000 A1 | 6/2014 | Reid | |
| 2014/0230481 A1 | 8/2014 | Yun et al. | |
| 2015/0183672 A1 | 7/2015 | Washburn et al. | |
| 2016/0025406 A1 | 1/2016 | An | |
| 2016/0136547 A1 | 5/2016 | Nuss | |
| 2016/0144301 A1 | 5/2016 | Tadlock et al. | |
| 2016/0271535 A1 | 9/2016 | Dong et al. | |
| 2016/0271536 A1 | 9/2016 | Joung et al. | |
| 2017/0021294 A1 | 1/2017 | Reid | |
| 2017/0072347 A1 | 3/2017 | Schmoll | |
| 2017/0259196 A1 | 9/2017 | Foix et al. | |
| 2017/0340993 A1 | 11/2017 | Zou | |
| 2018/0015400 A1 | 1/2018 | Park et al. | |
| 2018/0369728 A1 | 12/2018 | You et al. | |
| 2022/0176280 A1 | 6/2022 | Zou | |

FOREIGN PATENT DOCUMENTS

| | | | |
|---|---|---|---|
| CN | 100498163 C | 6/2009 | |
| CN | 201524475 U | 7/2010 | |
| CN | 102065974 B | 7/2014 | |
| CN | 107215905 A | 9/2017 | |
| CN | 108355494 A | 8/2018 | |
| CN | 305093856 S | 4/2019 | |
| CN | 210176521 U | 3/2020 | |
| CN | 306274350 S | 1/2021 | |
| DE | 102014006703 B4 | 10/2019 | |
| EP | 1328329 B1 | 12/2004 | |
| EP | 3222337 A1 | 9/2017 | |
| EP | 3552680 A1 | 10/2019 | |
| EP | 3552684 A1 | 10/2019 | |
| EP | 3650101 A1 | 5/2020 | |
| GB | 1283814 A | 8/1972 | |
| JP | 10066804 A | 3/1998 | |
| JP | 5765676 B2 | 8/2015 | |
| KR | 1020030068235 A | 8/2003 | |
| KR | 200384558 Y1 | 5/2005 | |
| KR | 100668767 B1 | 1/2007 | |
| KR | 100712266 B1 | 5/2007 | |
| KR | 1020070081912 A | 8/2007 | |
| KR | 100797051 B1 | 1/2008 | |
| KR | 1020080006177 A | 1/2008 | |
| KR | 100804302 B1 | 2/2008 | |
| KR | 100873665 B1 | 12/2008 | |
| KR | 1020090092881 A | 9/2009 | |
| KR | 1020100012979 A | 2/2010 | |
| KR | 2020110006467 U | 6/2011 | |
| KR | 101127426 B1 | 3/2012 | |
| KR | 1020130048427 A | 5/2013 | |
| KR | 101311654 B1 | 9/2013 | |
| KR | 101478965 B1 | 12/2014 | |
| KR | 1020150057791 A | 5/2015 | |
| KR | 1020160000194 A | 1/2016 | |
| KR | 101601391 B1 | 3/2016 | |
| KR | 101668804 B1 | 10/2016 | |
| KR | 101706993 B1 | 2/2017 | |
| KR | 101788965 B1 | 10/2017 | |
| KR | 1020190045880 A | 5/2019 | |
| KR | 1020190045881 A | 5/2019 | |
| KR | 1020190081761 A | 7/2019 | |
| WO | 0191881 A2 | 12/2001 | |
| WO | 2012086892 A1 | 6/2012 | |
| WO | 2013039194 A1 | 3/2013 | |
| WO | 2014056161 A1 | 4/2014 | |
| WO | 2014117426 A1 | 8/2014 | |
| WO | 2014171603 A1 | 10/2014 | |
| WO | 2015167248 A1 | 11/2015 | |
| WO | 2018104416 A1 | 6/2018 | |

OTHER PUBLICATIONS

Design U.S. Appl. No. 29/740,334, filed Jul. 2, 2020.
Design U.S. Appl. No. 29/802,158, filed Aug. 3, 2021.
Design U.S. Appl. No. 29/806,575, filed Sep. 3, 2021.
Office Action from U.S. Appl. No. 29/740,334 dated Apr. 22, 2022, 7 pages.

WATER FILTER

CROSS-REFERENCE TO RELATED APPLICATIONS

This application is a divisional of U.S. Non-Provisional patent application Ser. No. 17/366,014, filed Jul. 1, 2021, the entire contents of which is fully incorporated herein.

TECHNICAL FIELD

The present disclosure relates generally to water filter assemblies and systems, and more particularly, to a water filter cartridge, which may be used with water filtering systems (e.g., a refrigerator water filtration system) to treat fluids and/or liquids (e.g., water) to be dispensed therefrom.

BACKGROUND

Water filtration systems, for example, refrigerator water filtration systems, have become popular as they assist to produce cleaner and better tasting water. Some of these water filtration systems typically use water filters (e.g., a replaceable water filter cartridge) for filtering any water dispensed therefrom. Traditional water filter cartridges are provided with a filtering media, for example, a block of activated carbon or other granular filtration media, within a casing of the water filter cartridge to enhance water filtration capability. These traditional water filter cartridges also include water ports for feeding and dispensing water at least partially disposed in the casing with the filtering media. The water filter's filtering media can adsorb or remove contaminants such as sand, rust, and cysts within the flow of water prior to delivering water and/or ice to a user (e.g., via the refrigerator's water dispenser or ice maker).

Unfortunately, due to the complexity of the filtration process, and specifically, the flow path and flow rate of existing systems, the water filtering process is generally slow, which in some instances, may compromise the water filters performance, for example, due to an over saturation of the water filter with the filtered contaminates.

Accordingly, there is an unmet need for an improved water filter to further enhance water filtration by improving the filtering process flow rate and speed.

SUMMARY

In an exemplary embodiment, a water filter for use with an appliance is provided. The water filter includes a filtration material, and a filter housing spaced for accommodating at least a portion of the filtration material therein. The filter also includes a housing cap coupled to an upper end of the filter housing for enclosing the filtration material within the water filter. The housing cap includes an upper portion, a lower portion, and a channel formed through the upper portion and the lower portion. The water filter also includes an interface adapter accommodated in the channel. The interface adapter includes a side wall vertically extending from an upper surface of the interface adapter and partially around a perimeter of the upper surface. The adapter also includes a projection vertically extending from the upper surface. The projection is integrally formed with the upper surface and a portion of the side wall. The projection includes an opening to a water inlet path for receiving unfiltered water. A first portion of the projection on one side of the opening has a length that is longer than a second portion of the projection.

In another exemplary embodiment, an interface adapter for a water filter assembly is provided. The interface adapter includes an upper surface at an upper end of the interface adapter. The adapter also includes a filtering media interface at a lower end of the interface adapter, and an intermediate portion between the upper end and the lower end. The upper surface includes a side wall extending vertically therefrom and in an opposite direction from the lower end. The side wall extends partially around a perimeter of the upper end. The upper surface includes a projection extending vertically therefrom. The projection also extends from a portion of the side wall towards a gap defined between opposed ends of the side wall and includes an opening to an inlet extending therethrough. The portion of the projection extending from the opening towards the gap is longer than a portion of the projection extending from the opening to the side wall. A first end of the side wall is more proximate to the portion of the projection extending towards the gap that a second end of the side wall opposite the first end.

These and other objects, features and advantages of the present disclosure will become apparent from the following detailed description of illustrative embodiments thereof, which is to be read in connection with the accompanying drawings.

BRIEF DESCRIPTION OF THE DRAWINGS

These and other features of the present disclosure will become better understood with regard to the following description and accompanying drawings in which.

DETAILED DESCRIPTION

The general inventive concepts will be understood more fully from the detailed description given below and from the accompanying drawings of the various aspects and implementations of the disclosure. This should not be taken to limit the general inventive concepts to the specific aspects or implementations, which are being provided for explanation and understanding only.

Figure 1:
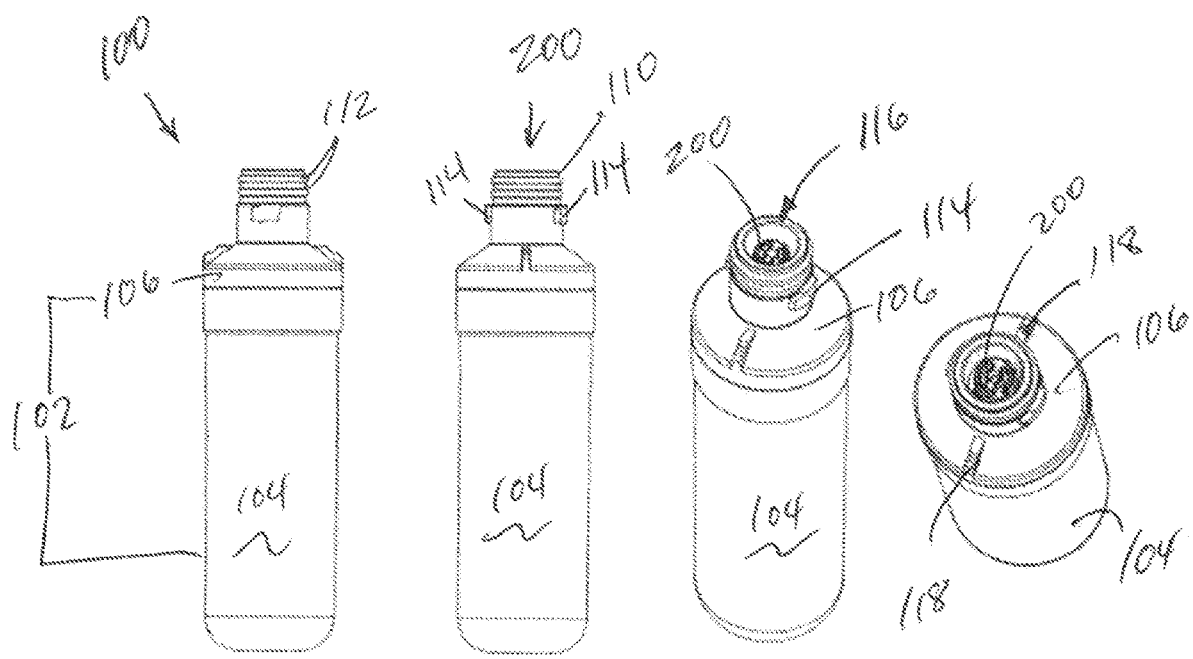
FIG. 1 illustrates perspective views of an exemplary embodiment of a water filter in accordance with the general inventive concepts.

Referring now to the drawings, which are for purposes of illustrating exemplary embodiments of the general inventive concepts, and not for limiting the same, FIG. 1 illustrates an exemplary embodiment of an improved water filter assembly (also referred to as a water filter) 100.

The water filter 100 includes at least a filter housing 102 defining one or more cavities or hollow spaces for at least partially receiving or enclosing filtration materials (also referred to as filtering media (known shown)) therein. The filter housing 102 may be unibody (i.e., a single piece construction). In some embodiments, for example, as shown in FIG. 1, the housing 102 may be formed from at least a housing body 104 and a housing cap 106 which may be coupled to an upper end of the housing body 104 to form an upper portion of the housing 102.

In some embodiments, the housing 102 or parts forming the housing (e.g., the housing body 104 and/or housing cap 106) may be cylindrically shaped (not limited thereto) to define a space for accommodating the filtering media. The housing body 104 may have an upper opening portion for receiving the filtering media. In some embodiments, the housing cap 106 may define a space for accommodating a portion of the filtering media.

Figure 2:
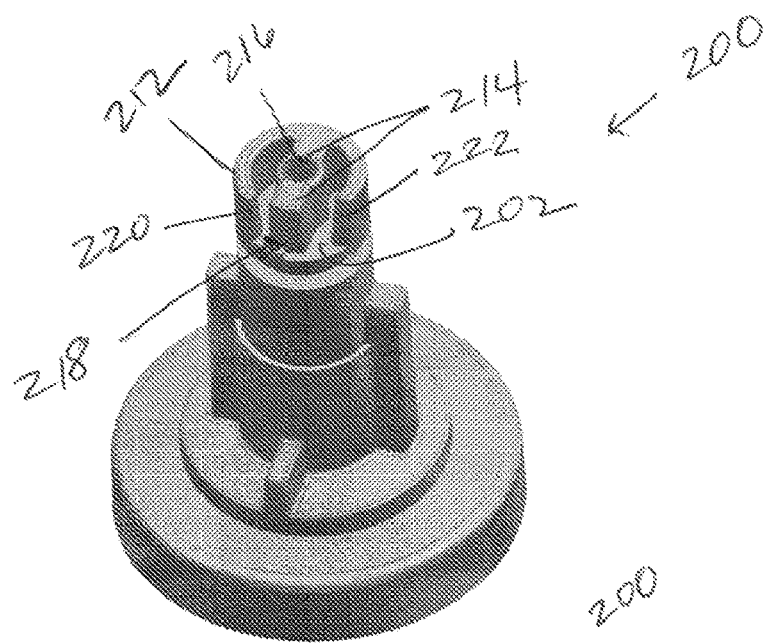
FIG. 2 illustrates a perspective view of an exemplary embodiment of an interface adapter for use in a water filter in accordance with the general inventive concepts.

The filtering media may be formed in a cylindrical shape (or other shape arrangeable within the housing 102) having hollowed portions at a center thereof in the vertical direction, for seating or otherwise arranging the filtering media within the housing and/or for at least partially receiving portions of an interface adapter 200 (FIG. 2).

The filtering media that may be used with the water filter 100 may include, for example, one or more blocks of activated carbon or a granular filtration media. However, it should be appreciated that other filtering media known in the art may be used with the water filter 100. In some embodiments, the filtering media may be fully enclosed within the housing 102 only when the housing cap 106 is coupled to the upper end of the housing body 104.

With continued reference to FIG. 1, an upper end of the water filter 100 (e.g., at an upper portion of the housing cap 106) includes an insertion portion 110, which may be operable configured to interface with one or more parts of a water purification system (e.g., a refrigerator filtration system). In some embodiments, one or more O-rings 112 may be vertically arranged at the insertion portion 110 for providing a seal when the water filter 100 is removably secured to the water purification system.

In some embodiments, the water filter 100 may also include one or more coupling guides 114 (two shown in FIG. 1) protruding from an outer circumferential surface of the housing cap 106 and proximate to the insertion portion 110. In some embodiments, the coupling guides 114 may be provided beneath the O-rings 112. It should be appreciated that the coupling guides 114 may be provided for guiding and/or aligning portions of the water filter 100 (e.g., the insertion portion 110) when removably securing the water filter 100 to the water purification system.

In some embodiments, the housing cap 106 may include one or more extension guides 118 (two shown in FIG. 1) protruding from a surface of the housing cap 106. It should be appreciated that the pair of extension guides 118 of FIG. 2 are arranged opposite each other on the housing cap 106 and extend from the surface of the housing cap 106 a distance to prevent overtightening of the water filter 100 during installation. It should be appreciated that the extension guides 118 may be shaped to interface with a corresponding part or surface of the water purification system.

With continued reference to FIG. 1, the water filter 100 includes an interface adapter 200 at least partially installed in an accommodating cavity (not shown) of the housing cap 106 at an upper part of the housing 102. It should be appreciated, that portions of an interior (or interior surface) of the housing cap 106 may be shaped or otherwise adapted for at least partially receiving or otherwise accommodating the interface adapter 200 therein and/or therebetween. It should also be appreciated, that as shown in FIG. 1, an upper portion of the interface adapter 200 may be accessible via an opening 116 of the housing cap 106 for interfacing with the water purification system.

In some embodiments, the interface adapter 200 may be a single piece construction. Additionally, or alternatively, the interface adapter 200 may be formed from a plurality of parts having a same or a similar construct (e.g., materials).

The interface adapter 200 includes at least a first surface 202 at an upper end 204 of the interface adapter 200, a filtering media interface 206 at a lower end 208 of the interface adapter, and an intermediate portion 210. In some embodiments, the first surface may include a side wall 212 vertically extending therefrom (in a direction opposite the lower end 208), and partially around a perimeter of the upper end 204. In some embodiments, the partial side wall 212 may vertically extend at an edge of the first surface 202 such that the edge and the side wall's 212 outer surface are flush. Additionally, or alternatively, the side wall 212 may extend around the perimeter of the upper end 204 and proximate to the edge resulting in a shoulder being defined at the upper end 204.

In some embodiments, the interface adapter 200 includes a projection 214 vertically extending from the first surface 202 and in the same direction as the side wall 212. In some embodiments, the projection 214 may be integrally formed with both the first surface 202 and portions of the side wall 212.

Figure 3:
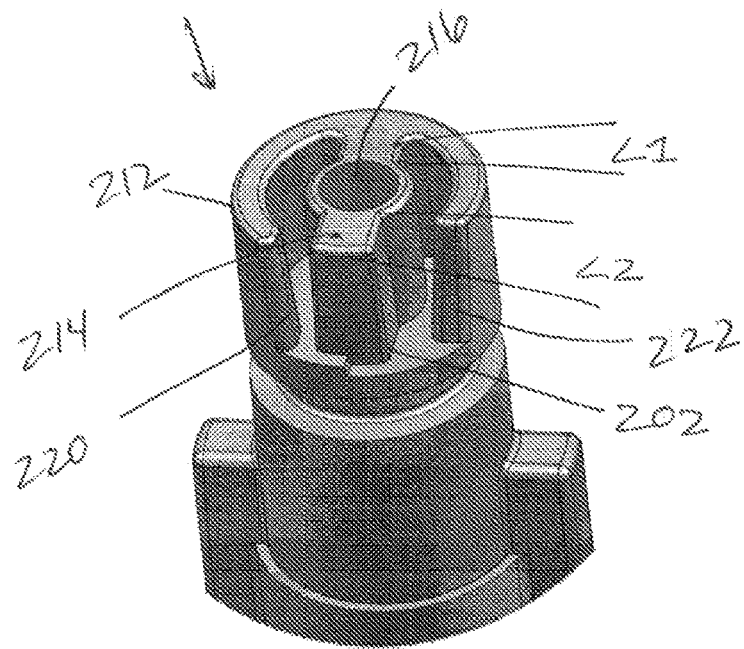
FIG. 3 illustrates a perspective view of an upper portion of the exemplary interface adapter of FIG. 2.
Figure 4:
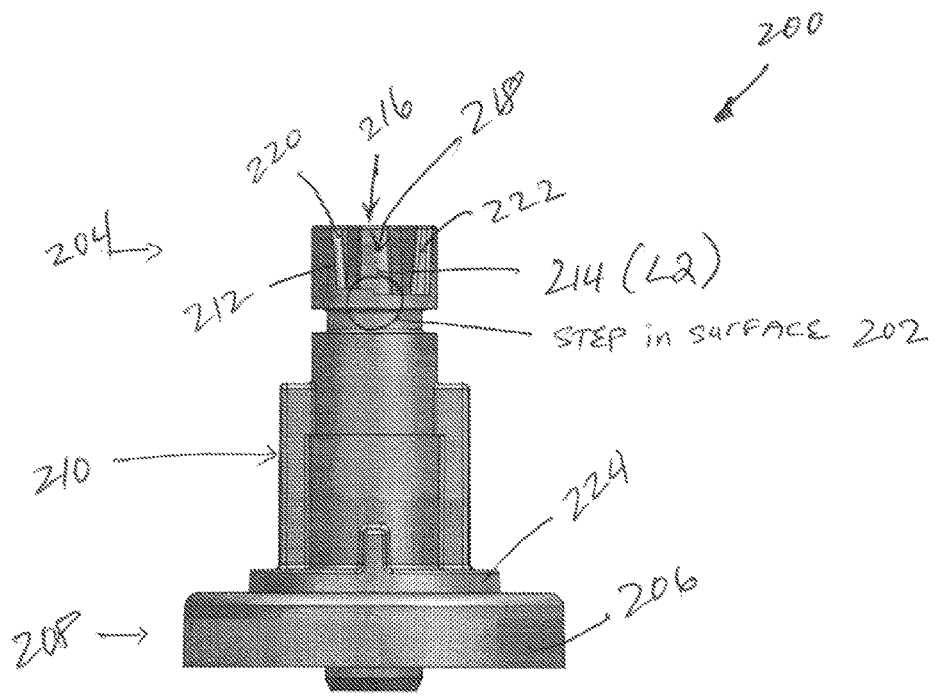
FIG. 4 illustrates a side view of the exemplary interface adapter of FIG. 2.
Figure 5:
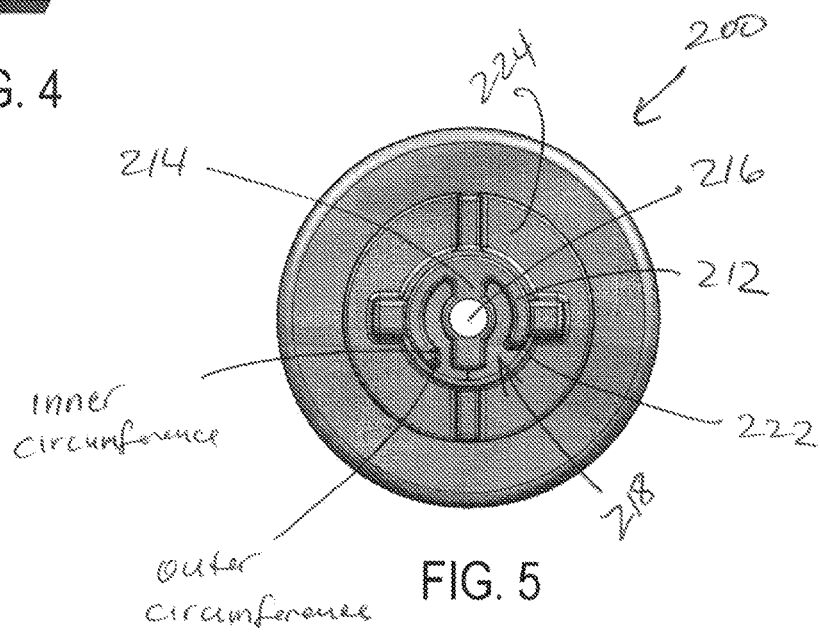
FIG. 5 illustrates a top view of the exemplary interface adapter of FIG. 2.
Figure 6:
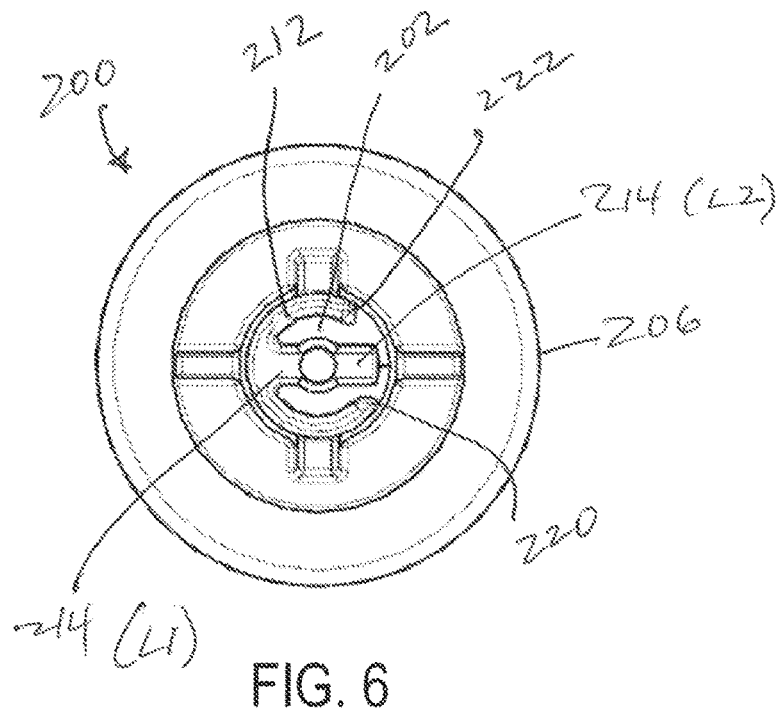
FIG. 6 illustrates a top view of an exemplary embodiment of an interface adapter for use in a water filter in accordance with the general inventive concepts.
Figure 7:
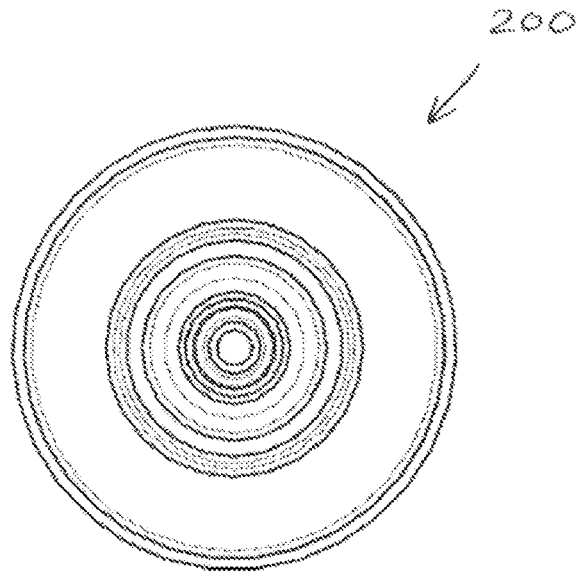
FIG. 7 illustrates a bottom view showing an exemplary embodiment of a filtration media interface of the exemplary interface adapter of FIG. 6.

As shown in the FIGS. 2-6, the projection 214 may include an opening 216 to an inlet flow path (not shown) of the interface adapter 200. In some embodiments, for example, as shown in FIG. 5, the opening 216 may be arranged or bored through the projection 214 such that portions of the projection 214 opposites the opening 216 have different lengths (L1 and L2). In the embodiment of FIG. 5, the projection 214 length L2 is longer than length L1.

In some embodiments, the shorter length L1 portion of the projection 214 is integral with both the first surface 202 and side wall 212. Additionally, or alternatively, the longer length L2 portion of the projection 214 extends at least partially towards the outer perimeter of the upper end 204 and beyond at least a path of the inner and/or outer circumferential path of the side wall 212.

As shown in the exemplary embodiment of FIG. 3, the long length L2 portion of the projection 214 extends into a gapped area 218 between opposite ends (220, 222) of the side wall 212. In some embodiments, the longer length L2 portion of the projection 214 is arranged closer to a first end 220 of the side wall 212 than a second end 222 of the side wall 212.

In some exemplary embodiments, as shown in FIG. 4, the first surface 202 may include a flange (or step portion) arranged or positioned in the gapped area 218 and between the ends (220, 222) of the side wall 212. In some embodiments, the interface adapter 200 may include a recessed area arranged or otherwise positioned between the upper end 204 and intermediate portion 210. It should be appreciated that the recessed area may be provided for interfacing with at least one or more of a seal (not shown) or portions of the housing cap 106 for securing the interface adapter 200 at least partially therein.

With continued reference to FIG. 3, a height of the side wall 212 at the first end 220 may be shorter than a height of the side wall 212 at the second end 222. It should be appreciated that the height of the side wall 212 may increase as the side wall 212 moves from the first end 220 towards the second end 222. In some embodiments, a height of the projection 214 may correspond to the height of the side wall at the second end 222. With continued reference to FIG. 4, one or more of the first end 220 and/or second end 222 may be sloped such that an angle defined where each end (220, 222) meets the first surface 202 is ≥90°.

With continued reference to the figures, the interface adapter 200 includes a water inlet (not shown) and a water outlet (not shown) for facilitating the water filtering process. It should be appreciated that unfiltered water from a water source may flow through the opening 216, which feeds the unfiltered water, via the water inlet, to the filtering media (or in some embodiments, a filtering chamber housing the filtering media) for removing impurities from the unfiltered water (i.e., filtering the water) using the filtering media. The filtering media may be a standard carbon filter or a membrane filter. However, it is understood that various types of filters may be used depending on the required purifying performance. An outer diameter of the filtering media may be smaller than the inner diameter of the housing 102 and a space for flowing water between the housing 102 and the outer surface of the filtering media may be formed.

In some embodiments, the interface adapter 200 may include a filtering media interface 206 for accommodating the upper end of the filtering media. The interface adapter 200 may further include an inserting portion 110 which extends from a central portion of the filtering media interface 206 in the lower direction and is inserted into the hollow portion of the filtering media of the filtering media. The interface adapter 200 may be disposed at the upper end of the filtering media and extend in the upper direction to form a passage connecting the inlet of the inserting portion 110 and the hollow portion of the filtering media to each other.

In some embodiments, the interface adapter 200 may include an interface step portion 224 (FIG. 4) which projects from the upper surface of the inserting portion 110 in the upper direction. In some embodiments, the intermediate portion 210 may extend from a center of an upper surface of the interface step portion 224 toward the inside of the inserting portion 110.

Additionally, or alternatively, an inside portion of the inserting portion 110 may be formed having a hollow shape. A housing fastening part for being coupled with the interface adapter 200 may protrude from an inner side of the inserting portion 110. In some embodiments, the interface adapter 200 may be accommodated in a second accommodating space in which the housing cap 106 is defined.

The interface adapter 200 may be coupled to the upper portion of the filtering media and the inner surface of the housing cap 106, respectively. In some embodiments, when the interface adapter 200 and the filtering media are coupled together, the filtering media interface 206 may surround the upper surface and a circumference of the filtering media.

Portions of the inserting portion 110 (e.g., an underside (not shown) of the inserting portion 110) may be inserted into the hollow portion of the filtering media such that it is in contact with an inner surface of the filtering media so that the interface adapter 200 is capable of being fixedly mounted on the upper surface of the filtering media. The inside portion of the inserting portion 110 may be hollow such that it is capable of communicating with a filter outlet flow path formed on the intermediate portion 210. Accordingly, the purified water flowing into the hollow portion of the filtering media may pass through the inserting portion 110, the filter outlet flow path and filter outlet port, and may be discharged through an opening of the inserting portion 110.

The interface step portion 224 may protrude from the upper surface of the filtering media interface 206. The interface step portion 224 may have a smaller diameter than the filtering media interface 206. The intermediate portion 210 may be located in the inserting portion 110 when the housing cap 106 and the interface adapter 200 are coupled together. The inlet flow path and filter outlet flow path may be formed in the intermediate portion 210. Water supplied into the inside portion of the water filter 100, and discharged from the purified water from the water filter 100 is capable of being performed through the intermediate portion 210. For example, a first filter inlet flow path extending in a lower direction (not shown) may be formed on the opened upper surface of the intermediate portion 210.

In some embodiments, the interface step portion 224 may include a second filter inlet flow path passing across the interface step portion 224. The second filter inlet flow path may have an opening formed in a circumferential surface of the interface step portion 224 and extending toward the center of the interface step portion 224. The first filter inlet flow path and the second filter inlet flow path may be connected to each other at a lower end of the intermediate portion 210 (i.e., at the inside of the interface step portion 224). Accordingly, the water which flows through the inserting portion 110 flows through the first filter inlet flow path of the intermediate portion 210 and then flows along the second filter inlet flow path which may be branched into both sides at the lower end of the first filter inlet flow path to the outside, and may be capable of being discharged through an opening of the circumference of the interface step portion 224. The water discharged through the filter inlet flow path may flow along the space between the housing 102 and the filtering media.

Additionally, or alternatively, the intermediate portion 210 may include a first extending portion which extends from the upper surface of the interface step portion 224 and a second extending portion which extends from the first extending portion in the upper direction. The first extending portion may have an outer diameter which is larger than the outer diameter of the second extending portion and a filter outlet port may be formed on an upper side portion of the first extending portion.

In some embodiments, a recessed guide surface may be formed on an outer surface of the second extending portion of the upper side of the filter outlet port. The guide surface may be spaced apart from the filter outlet port in the upper direction. Water may be guided to the outside of the second extending portion by the guide surface for a more effective flow.

It is to be understood that the detailed description is intended to be illustrative, and not limiting to the embodiments described. Other embodiments will be apparent to those of skill in the art upon reading and understanding the above description. Moreover, in some instances, elements described with one embodiment may be readily adapted for use with other embodiments. Therefore, the methods and systems described herein are not limited to the specific details, the representative embodiments, or the illustrative examples shown and described. Accordingly, departures may be made from such details without departing from the spirit or scope of the general aspects of the present disclosure.

The invention claimed is:

1. An interface adapter for a water filter assembly, comprising:
    an upper surface at an upper end of the interface adapter;
    a filtering media interface at a lower end of the interface adapter; and
    an intermediate portion between the upper end and the lower end;
    wherein the upper surface includes a side wall extending vertically therefrom and in an opposite direction from the lower end, wherein the side wall extends partially around a perimeter of the upper end; wherein the upper surface includes a projection extending vertically therefrom to a height of the projection, wherein the projection also extends from a portion of the side wall towards a gap defined between opposed ends of the side wall, wherein an opening to an inlet is formed in the projection, wherein a length of a first portion of the projection extending from the inlet towards the gap is greater than a length of a second portion of the projection extending from the opening to the side wall, and wherein a first end of the side wall is more proximate to the first portion of the projection than a second end of the side wall opposite the first end.

2. The interface adapter of claim 1, wherein a height of the first end of the side wall is shorter than a height of the second end of the side wall.

3. The interface adapter of claim 1, wherein a height of the projection corresponds to a height of the second end of the side wall.

4. The interface adapter of claim 1, wherein a height of the side wall varies along the perimeter from the first end to the second end.

* * * * *